US00RE46862E

(19) United States
(12) Reissued Patent
Glass et al.

(10) Patent Number: US RE46,862 E
(45) Date of Reissued Patent: May 22, 2018

(54) SACRIFICIAL ANODE ASSEMBLY

(75) Inventors: Gareth K. Glass, Lichfield (GB); Adrian C. Roberts, Nottingham (GB); Nigel Davidson, Coton-in-the-elms (GB)

(73) Assignee: Vector Corrosion Technologies Ltd., Winnipeg, MB (CA)

(21) Appl. No.: 13/456,929

(22) Filed: Apr. 26, 2012

Related U.S. Patent Documents

Reissue of:
(64) Patent No.: 7,704,372
Issued: Apr. 27, 2010
Appl. No.: 11/587,647
PCT Filed: Apr. 29, 2005
PCT No.: PCT/GB2005/001651
§ 371 (c)(1),
(2), (4) Date: Apr. 25, 2007
PCT Pub. No.: WO2005/106076
PCT Pub. Date: Nov. 10, 2005

(30) Foreign Application Priority Data

Apr. 29, 2004 (GB) ..... 0409521.2

(51) Int. Cl.
*C23F 13/02* (2006.01)
*C23F 13/04* (2006.01)
(Continued)

(52) U.S. Cl.
CPC ..... *E04C 5/015* (2013.01); *C23F 13/06* (2013.01); *C23F 13/10* (2013.01); *C23F 2201/02* (2013.01); *C23F 2213/21* (2013.01)

(58) Field of Classification Search
CPC ..... E04C 5/015; C23F 13/06; C23F 13/10; C23F 2213/21; C23F 2201/02
(Continued)

(56) References Cited

U.S. PATENT DOCUMENTS 2,903,405 A 9/1959 Sabins
4,486,288 A 12/1984 Linder
(Continued)

FOREIGN PATENT DOCUMENTS

DE 101 41 743 A1 3/2003
EP 0 085 582 A1 * 8/1983
(Continued)

OTHER PUBLICATIONS

International Search Report mailed Mar. 29, 2006 in PCT/GB2005/001651.
Written Opinion mailed Mar. 29, 2006 in PCT/GB2005/001651.

*Primary Examiner* — Sean E Vincent
(74) *Attorney, Agent, or Firm* — Adrian D. Battison; Ade & Company Inc; Ryan W. Dupuis

(57) ABSTRACT

[A sacrificial anode assembly for cathodically protecting and/or passivating a metal section, comprising: (a) a cell, which has an anode and a cathode arranged so as to not be in electronic contact with each other but so as to be in ionic contact with each other such that current can flow between the anode and the cathode; (b) a connector attached to the anode of the cell for electrically connecting the anode to the metal section to be cathodically protected; and (c) a sacrificial anode electrically connected in series with the cathode of the cell; wherein the cell is otherwise isolated from the environment such that current can only flow into and out of the cell via the sacrificial anode and the connector. The invention also provides a method of cathodically protecting metal in which such a sacrificial anode assembly is cathodically attached to the metal via the connector of the assembly, and a reinforced concrete structure wherein some or all of the reinforcement is cathodically protected by such a method.] *A sacrificial anode assembly for cathodically protecting and/or passivating a metal section, includes a cell with an anode and a cathode, a connector attached to the*
(Continued)

*anode of the cell for electrically connecting the anode to the metal section to be cathodically protected; and a sacrificial anode electrically connected in series with the cathode of the cell. The cell is otherwise isolated from the environment such that current can only flow into and out of the cell via the sacrificial anode and the connector. A method of cathodically protecting steel in concrete in which such the sacrificial anode assembly is connected to the steel in an initial step of passivation using a higher current and when the first step is terminated the sacrificial anode alone continues to provide protection.*

45 Claims, 3 Drawing Sheets

(51) Int. Cl.

| | |
|---|---|
| ***C23F 13/08*** | (2006.01) |
| ***C23F 13/14*** | (2006.01) |
| ***C23F 13/20*** | (2006.01) |
| ***E04C 5/01*** | (2006.01) |
| ***C23F 13/10*** | (2006.01) |
| ***C23F 13/06*** | (2006.01) |

(58) Field of Classification Search
USPC ..... 205/730, 734, 740; 204/196.1, 196.17, 204/196.23, 196.24, 196.25, 196.36, 204/196.37
See application file for complete search history.

(56) References Cited

U.S. PATENT DOCUMENTS

| | | | | |
|---|---|---|---|---|
| H544 | H * | 11/1988 | Castillo et al. | 205/734 |
| 4,861,449 | A * | 8/1989 | St. Onge | 204/196.21 |
| 4,900,410 | A | 2/1990 | Bennett et al. | |
| 5,183,694 | A * | 2/1993 | Webb | 205/734 |
| 5,650,060 | A * | 7/1997 | Huang et al. | 205/730 |
| 5,674,561 | A | 10/1997 | Dietz et al. | |
| 5,714,045 | A | 2/1998 | Lasa et al. | |
| 6,022,469 | A | 2/2000 | Page | |
| 6,165,346 | A * | 12/2000 | Whitmore | 205/734 |
| 6,265,105 | B1 | 7/2001 | Tokuda et al. | |
| 6,322,691 | B1 | 11/2001 | Miller | |
| 6,346,188 | B1 | 2/2002 | Shuster et al. | |
| 7,264,708 | B2 * | 9/2007 | Whitmore et al. | 205/734 |
| RE45,234 | E * | 11/2014 | Whitmore et al. | 205/734 |

FOREIGN PATENT DOCUMENTS

| | | |
|---|---|---|
| GB | 2 194 962 A | 3/1988 |
| GB | 2286196 | 8/1995 |
| JP | 59193283 | 11/1984 |
| JP | 2-200787 | 8/1990 |
| JP | 9-31675 | 2/1997 |
| WO | WO1994029496 | 12/1994 |
| WO | WO 03/010358 A2 | 2/2003 |
| WO | WO2006097770 | 9/2006 |

* cited by examiner

SACRIFICIAL ANODE ASSEMBLY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application is the US national phase of international application PCT/GB2005/001651 filed 29 Apr. 2005 which designated the U.S. and claims benefit of GB 0409521.2, dated 29 Apr. 2004, the entire content of which is hereby incorporated by reference.

The present invention relates to sacrificial anode assemblies suitable for use in the sacrificial cathodic protection of steel reinforcements in concrete, to methods of sacrificial cathodic protection and to reinforced concrete structures wherein the reinforcement is protected by sacrificial cathodic protection.

BACKGROUND OF THE INVENTION

The cathodic protection of metal sections of structures is well known. This technique provides corrosion protection for the metal section by the formation of an electrical circuit that results in the metal section acting as a cathode and therefore oxidation of the metal does not occur.

One such known type of system for cathodic protection is the impressed current system, which makes use of an external power supply, either mains or battery, to apply current to the metal section to be protected so as to make it cathodic. These systems generally require complex circuits to apply the current appropriately and control systems to control the application of the current. Furthermore, those that are supplied with mains power clearly can encounter difficulties with power supply problems such as power surges and power cuts, whilst those powered by battery have to overcome the issue of locating the battery at an appropriate position, which both allows the battery to function correctly and supports the weight of the battery.

Often, therefore, such impressed current systems have a battery secured to the exterior of the structure containing the metal sections to be protected, which clearly adversely affects the look of the structure.

Other systems for cathodic protection, which avoid the need for bulky or complex components make use of a sacrificial anode coupled to the metal section. The sacrificial anode is a more reactive metal than the metal of the metal section and therefore it corrodes in preference to the metal section, and thus the metal section remains intact.

This technique is commonly used in the protection of the steel reinforcements in concrete, by electrically connecting the steel to a sacrificial anode, with the circuit being completed by electrolyte in the pores of the concrete. Protection of the steel reinforcements is in particular required when chloride ions are present at significant concentrations in the concrete, and therefore cathodic protection is widely used in relation to concrete structures in locations which are exposed to salt from road de-icing or from marine environments.

A problem associated with such cathodic protection arises from the fact that it is the voltage between the sacrificial anode and the metal section that drives current through the electrolyte between these components. This voltage is limited by the natural potential difference that exists between the metal section and the sacrificial anode. Accordingly, the higher the resistance of the electrolyte, the lower the current flow is across the electrolyte between a given metal section and sacrificial anode, and hence the application of sacrificial cathodic protection is restricted.

Accordingly, there is a need for a sacrificial anode assembly that can give rise to a voltage between itself and the metal section greater than the natural potential difference that exists between the metal section and the material of the sacrificial anode.

SUMMARY OF THE INVENTION

The present invention provides, in a first aspect, a sacrificial anode assembly for cathodically protecting and/or passivating a metal section, comprising a cell, which has an anode and a cathode arranged so as to not be in electronic contact with each other but so as to be in ionic contact with each other such that current can flow between the anode and the cathode, wherein the anode of the cell is attached to a connector for electrically connecting the anode to the metal section to be cathodically protected, and the cathode of the cell is electrically connected in series with a sacrificial anode, but the cell is otherwise isolated from the environment such that current can only flow into and out of the cell via the sacrificial anode and the connector.

When such an assembly is connected to a metal section to be cathodically protected, for example a steel section in concrete, the potential difference between the metal section and the sacrificial anode is greater than the natural potential difference between the metal section and the sacrificial anode, and therefore a useful level of current flow can be achieved even in circuits with high resistance. Accordingly, the sacrificial anode assembly can be used to provide sacrificial cathodic protection of a metal section in locations whereby sacrificial cathodic protection was not previously able to be applied at a useful level due to the circuit between the metal section and the sacrificial anode being completed by a material, such as an electrolyte, of high resistance.

Further, as the potential difference between the metal section and the sacrificial anode is greater than the natural potential difference between the metal section and the sacrificial anode, it is possible to have increased spacing between anodes where a multiplicity of sacrificial anode assemblies are deployed in a structure. This of course reduces the total number of assemblies required in a given structure.

In addition, the assembly of the present invention produces a high initial current. This is in particular useful as it allows the assembly to be used to passivate metals, such as steel, which metals may be in an active corrosion state or may be in new concrete.

Furthermore, the anode assembly of the present invention may suitably be located in a concrete or other structure that includes a metal section requiring cathodic protection, or may be encased in a material identical or similar to that of the structure and this encased assembly may then be secured to the exterior of the structure. The look of the structure can therefore be maintained, as no components dissimilar in appearance to the structure itself are present on the exterior of the structure.

When the cell of the assembly of the present invention ultimately becomes depleted, the sacrificial element may still remain active and thus continue to provide cathodic protection.

The sacrificial anode and the cell may be connected together so as to form a single unit; in particular the sacrificial anode assembly may be a single unit. This is advantageous in that it reduces the complexity of the product and makes it easier to embed the assembly in the structure that includes the metal section to be protected or in a material identical or similar to that of the structure.

In particular, the sacrificial anode may be located in the assembly such that it is adjacent to the cell. The sacrificial anode may be of a shape and size corresponding with the shape of at least part of the cell, such that it fits alongside at least part of the cell. In a preferred embodiment the sacrificial anode forms a container within which the cell is located.

The sacrificial anode may be directly connected to the cathode of the cell, being in direct contact with the cathode of the cell, or may be indirectly connected to the cathode of the cell. In a preferred embodiment, the sacrificial anode is indirectly connected to the cathode of the cell via an electronically conductive separator. This is advantageous because it assists in preventing the direct corrosion of the sacrificial anode at its contact with the cathode of the cell. For example, a layer of a metal, such as a layer of plated copper or nickel, may be located between the sacrificial anode and the cathode of the cell so as to allow electronic conduction between these components but to prevent direct contact between these components.

The sacrificial anode must clearly have a more negative standard electrode potential than the metal to be cathodically protected by the sacrificial anode assembly. Accordingly, when the sacrificial anode assembly is for use in reinforced concrete, the sacrificial anode must have a more negative standard electrode potential than steel. Examples of suitable metals are zinc, aluminium, cadmium and magnesium and examples of suitable alloys are zinc alloys, aluminium alloys, cadmium alloys and magnesium alloys. The sacrificial anode may suitably be provided in the form of cast metal/alloy, compressed powder, fibres or foil.

The connector for electrically connecting the anode to the metal section to be cathodically protected may be any suitable electrical connector, such as a connector known in the art for use with sacrificial anodes. In particular the connector may be steel, galvanised steel or brass, and the connector may suitably be in the form of a wire; preferably the connector is galvanised steel wire.

The cell may be any conventional electrochemical cell. In particular, the cell may comprise an anode which is any suitable material and a cathode which is any suitable material, provided of course that the anode has a more negative standard electrode potential than the cathode. Suitable materials for the anode include metals such as zinc, aluminium, cadmium, lithium and magnesium and alloys such as zinc alloys, aluminium alloys, cadmium alloys and magnesium alloys. Suitable materials for the cathode include metal oxides such as oxides of manganese, iron, copper, silver and lead, and mixtures of metal oxides with carbon, for example mixtures of manganese dioxide and carbon. The anode and the cathode may each be provided in any suitable form, and may be provided in the same form or in different forms, for example they may each be provided as a solid element, such as in the form of a cast metal/alloy, compressed powder, fibres or foil, or may be provided in loose powdered form.

It is preferred that, as in conventional cells, the anode is in contact with an electrolyte. When the anode is in loose powdered form, this powder may be suspended in the electrolyte. The electrolyte may be any known electrolyte, such as potassium hydroxide, lithium hydroxide or ammonium chloride. The electrolyte may contain additional agents, in particular it may contain compounds to inhibit hydrogen discharge from the anode, for example when the anode is zinc the electrolyte may contain zinc oxide.

The anode and the cathode are arranged so as to not be in electronic contact with each other but to be in ionic contact with each other such that current can flow from the anode to the cathode. In this respect it is preferred that, as in conventional cells, the anode and the cathode are connected via an electrolyte. Suitably, therefore, an electrolyte is provided between the anode and the cathode, to allow ionic current to flow between the anode and the cathode.

The cell may be provided with a porous separator located between the cathode and the anode, which consequently prevents direct contact between the anode and the cathode. This is in particular useful in assemblies of the present invention whereby the anode is provided in loose powdered form, and more particularly when this powder is suspended in the electrolyte.

The cell in the assembly is isolated from the environment, other than to the extent that attachment to the connector and the sacrificial anode makes necessary; this may be achieved by the use of any suitable isolating means around the cell. This isolation is, in particular, beneficial as it ensures that electrolyte in the environment does not come into contact with the cell. The cell may be isolated in this way by one isolating means or more than one isolating means which together achieve the necessary isolation. The isolating means clearly must be electrically insulating material, so that current will not flow through it, such as silicone-based material.

As one of the permitted electrical connections of the cell is an electrical connection to the sacrificial anode, the amount of isolating means required can be reduced by increasing the area of the exterior of the cell located adjacent the sacrificial anode. Accordingly, in a preferred embodiment the sacrificial anode is in the shape of a container and the cell is located in the container, for example the sacrificial anode may be in the shape of a can, i.e. having a circular base and a wall extending upwards from the circumference of the base so as to define a cavity, and the cell is located in this can. The remaining areas of the cell that are not covered by the sacrificial anode and that are not covered by their contact with the connector are of course isolated from the environment by isolating means.

It is preferred that the quantities of the anode and cathode materials utilised in the assembly are such that they will each deliver the same quantity of charge during the life of the assembly, as this clearly maximises the efficiency of this system.

The anode assembly may be surrounded by an encapsulating material, such as a porous matrix. In particularly, the assembly may have a suitable encapsulating material precast around it before use. Alternatively, the encapsulating material may be provided after the assembly is located at its intended position, for example after the assembly has been located in a cavity in a concrete structure; in this case a suitable encapsulating material may be deployed to embed the assembly.

The encapsulating material may suitably be such that it can maintain the activity of the sacrificial anode casing, absorb any expansive forces generated by expansive corrosion products, and/or minimise the risk of direct contact between the conductor and the sacrificial anode, which would discharge the internal cell in the anode assembly. The encapsulating material may, for example, be a mortar, such as a cementitious mortar.

Preferably the anode assembly is surrounded by an encapsulating material containing activators to ensure continued corrosion of the sacrificial anode, for example an electrolyte that in solution has a pH sufficiently high for corrosion of the sacrificial anode to occur and for passive film formation on the sacrificial anode to be avoided when the anode assembly is cathodically connected to the material to be cathodically protected by the anode assembly. In particular, the encapsulating material may comprise a reservoir of alkali such as lithium hydroxide or potassium hydroxide, or other suitable activators known in the art, such as humectants. The encapsulating material is preferably a highly alkaline mortar, such as those known in the art as being of use for surrounding sacrificial zinc, for example a mortar comprising lithium hydroxide or potassium hydroxide and having a pH of from 12 to 14.

The mortar may suitably be rapid hardening cement; this is particularly of use in embodiments whereby the encapsulating material is to be pre-cast. For example, the mortar may be a calcium sulphoaluminate. The mortar may alternatively be a Portland cement mortar with a water/cement ratio of 0.6 or greater containing additional lithium hydroxide or potassium hydroxide, such as those mortars discussed in U.S. Pat. No. 6,022,469.

In a second aspect, the present invention provides a method of cathodically protecting metal in which a sacrificial anode assembly in accordance with the first aspect of the present invention is cathodically attached to the metal via the connector of the assembly. In particular, a method of cathodically protecting steel reinforcement in concrete is provided, in which a sacrificial anode assembly in accordance with the first aspect of the present invention is cathodically attached to the steel.

In a third aspect, the present invention provides a reinforced concrete structure wherein some or all of the reinforcement is cathodically protected by the method of the second aspect.

BRIEF DESCRIPTION OF THE DRAWINGS

The invention will now be further described in the following examples, with reference to the drawings in which:

FIG. 1b shows a section A-A through the sacrificial anode assembly as shown in FIG. 1a;

DETAILED DESCRIPTION OF THE INVENTION

Example 1

Figure 1A:
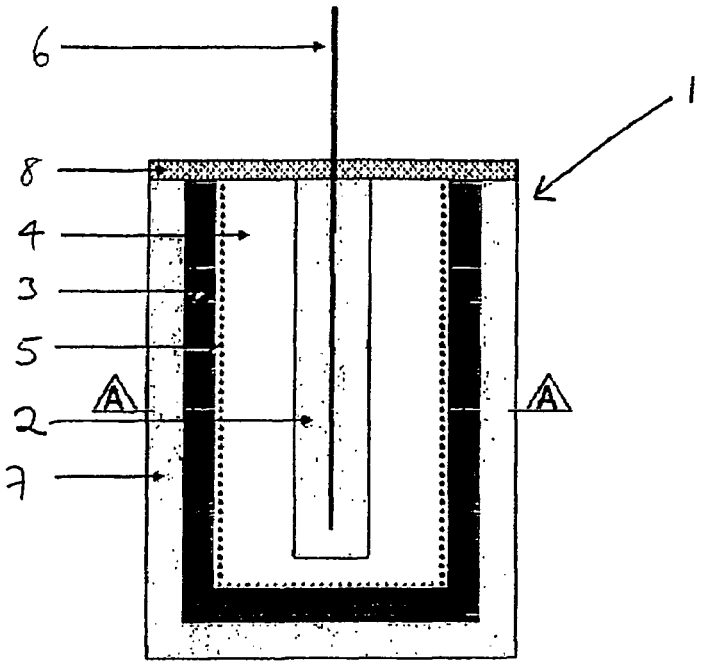
FIG. 1a shows a cross section through a sacrificial anode assembly in accordance with the invention.
Figure 1B:
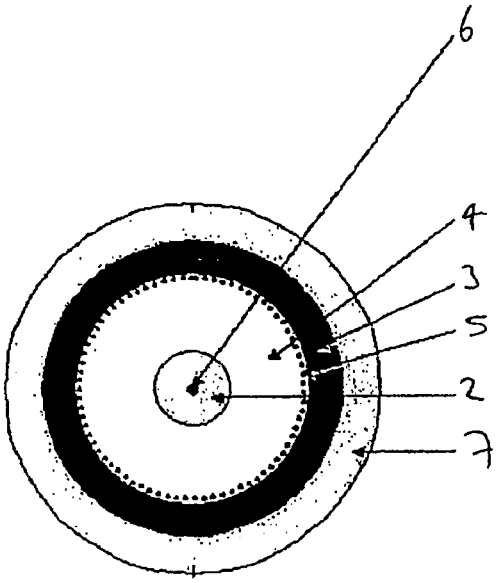

FIG. 1 shows a sacrificial anode assembly 1 for cathodically protecting a metal section. The assembly comprises a cell, which has an anode 2 and a cathode 3. The cathode 3 is a manganese dioxide/carbon mixture and is in the shape of a can, having a circular base and a wall extending upwards from the circumference of the base, so as to define a cavity. The anode 2 is a solid zinc anode of cylindrical shape, with the solid zinc being cast metal, compressed powder, fibres or foil. The anode 2 is located centrally within the cavity defined by the can shaped cathode 3 and is in contact with electrolyte 4 present in the cavity defined by the can shaped cathode 3, which maintains the activity of the anode. The electrolyte 4 is suitably potassium hydroxide, and may contain other agents such as zinc oxide to inhibit hydrogen discharge from the zinc. A porous separator 5, which is can shaped, is located inside the cavity 3a defined by the cathode 3, adjacent to the cathode 3. Accordingly, anode 2 and cathode 3 are not in electronic contact with each other, but are ionically connected via the electrolyte 4 and porous separator 5 such that current can flow between the anode 2 and the cathode 3.

The anode 2 is attached to a connector 6 for electrically connecting the anode 2 to the metal section to be cathodically protected. The connector 6 is suitably galvanised steel. The cathode 3 of the cell is electrically connected in series with a sacrificial anode 7. Sacrificial anode 7 is solid zinc and is can shaped, with the solid zinc being cast metal, compressed powder, fibres or foil. The cell is located inside the cavity defined by the can shaped sacrificial anode 7. A layer of electrically insulating material 8 is located across the top of the assembly to isolate the cell from the external environment and accordingly current can only flow into and out of the cell via the sacrificial anode 7 and the connector 6.

The sacrificial anode assembly 1 may subsequently be surrounded by a porous matrix; in particular a cementitious mortar such as a calcium sulphoaluminate may be pre-cast around the assembly 1 before use. The matrix may also suitably comprise a reservoir of alkali such as lithium hydroxide.

The sacrificial anode assembly 1 may be utilised by being located in a concrete environment and connecting the conductor 6 to a steel bar also located in the concrete. Current is accordingly driven through the circuit comprising the anode assembly 1, the steel and the electrolyte in the concrete, by the voltage across the cell and the voltage between the sacrificial anode 7 and the steel, which two voltages combine additatively. The reactions that occur at the metal/electrolyte interfaces result in the corrosion of the zinc sacrificial anode 7 and the protection of the steel.

Example 2

Figure 2:
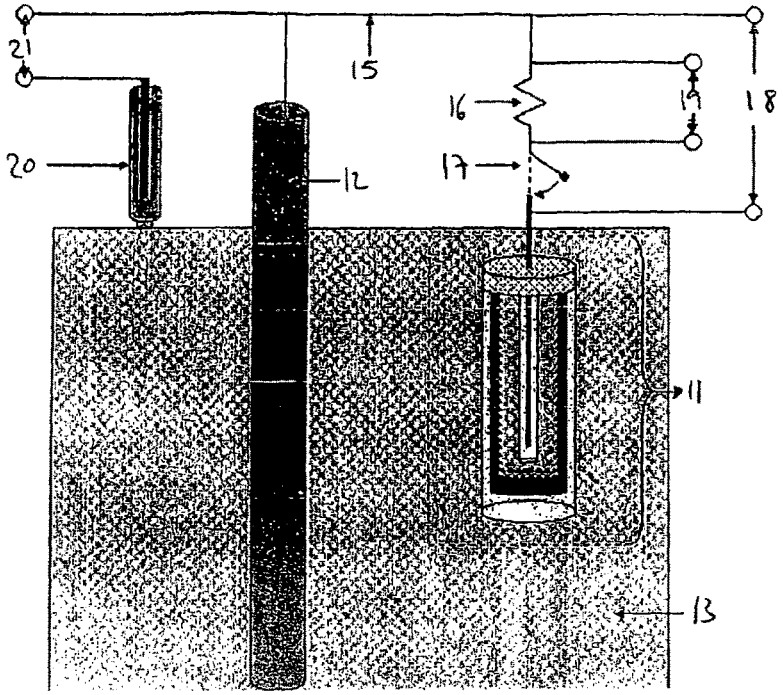
FIG. 2 shows a sacrificial anode assembly of the present invention connected to steel in a test arrangement.

FIG. 2 shows a sacrificial anode assembly 11 connected to a 20 mm diameter mild steel bar 12 in a 100 mm concrete cube 13 consisting of 350 kg/m$^3$ ordinary Portland cement concrete contaminated with 3% chloride ion by weight of cement.

The sacrificial anode assembly 11 comprises a cell, which is an AA size Duracell battery, and a sacrificial anode, which is a sheet of pure zinc folded to produce a zinc can around the cell. This zinc is folded so as to contact the positive terminal of the cell, and a conductor 14 is soldered to the negative terminal of the cell. A silicone-based sealant is located over the negative and positive cell terminals so as to insulate them from the environment.

Prior to placing the sacrificial anode assembly 11 in the concrete cube, potentials were measured using a digital multimeter with an input impedance of 10 Mohm, which showed that the potential between the external zinc casing and a steel bar in moist chloride contaminated sand was 520 mV and the potential between the conductor and the steel was 2110 mV. This suggests that the sacrificial anode assembly 11 would have 1590 mV of additional driving voltage over that of a conventional sacrificial anode to drive current through the electrolyte between the anode and the protected steel.

As shown in FIG. 2, the circuit from the sacrificial anode assembly 11 through the electrolyte in the concrete cube 13 to the steel bar 12 was completed by copper core electric cables 15, with a 10 kOhm resistor 16 and a circuit breaker 17 also being included in the circuit. The drive voltage between the anode and the steel was monitored across monitoring points 18 while the current flowing was determined by measuring the voltage across the 10 kOhm resistor at monitoring points 19. A saturated calomel reference electrode (SCE) 20 was installed to facilitate the independent determination of the steel potential across monitoring points 21.

Figure 3:
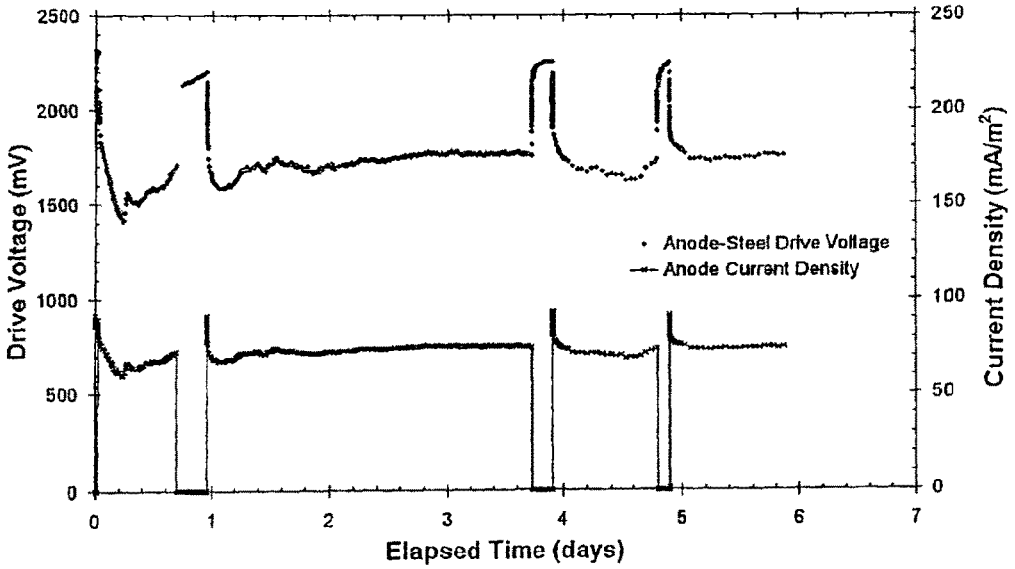
FIG. 3 is a graph showing the drive voltage and current density of the sacrificial anode assembly as shown in FIG. 3.

The drive voltage, sacrificial cathodic current and steel potential were logged at regular intervals. The drive voltage and sacrificial cathodic current expressed relative to the anode surface area are shown in FIG. 3. The anode-steel drive voltage was approximately 2.2 to 2.4 volts in the open circuit condition (circuit breaker open) and fell to 1.5 to 1.8 volts when current was been drawn.

Figure 4:
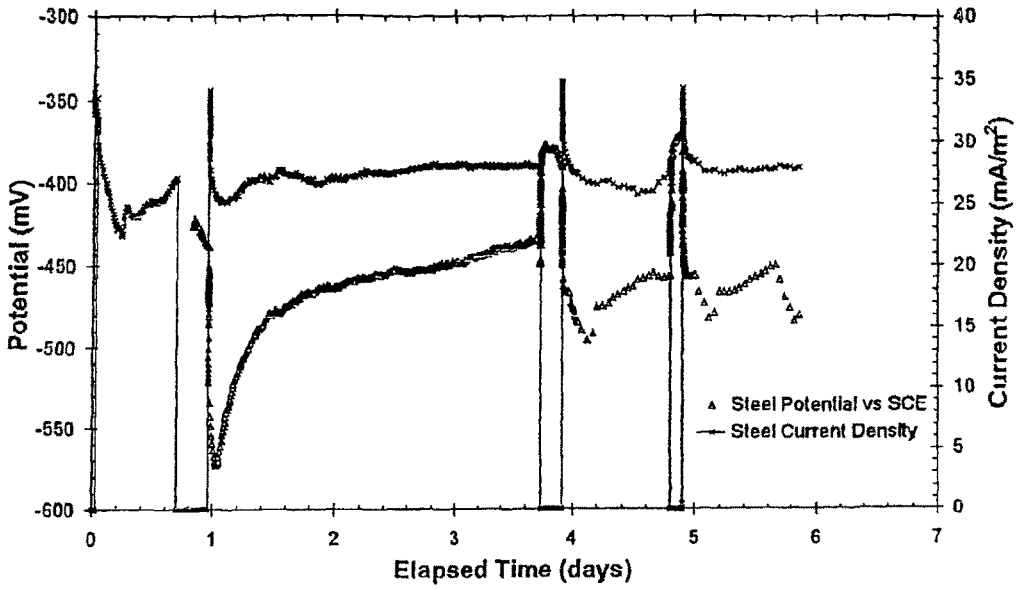
FIG. 4 shows the potential and current density for the protected steel as connected to the sacrificial anode assembly in FIG. 3.

The steel potential and sacrificial cathodic current expressed relative to the steel surface area are shown in FIG. 4. The initial steel potential varied between −410 and −440 mV on the SCE scale. This varied with the moisture content of the concrete at the point of contact between the SCE and the concrete. This negative potential reflects the aggressive nature of the chloride contaminated concrete towards the steel. The steel current density varied between 25 and 30 $mA/m^2$.

The steel potential decay following the interruption of the current (circuit breaker open) was approximately 100 mV, indicating that steel protection is being achieved. This also means that, of the 1.5 to 1.8 volts anode-steel drive voltage, more than 1.4 volts would be available to overcome the circuit resistance to current flow. This is significantly more voltage than could be provided by a sacrificial anode as currently available to overcome circuit resistance to current flow.

It is therefore clear that in high resistivity environments, i.e. where the circuit resistance to current flow presented by the conditions is high, the sacrificial anode assembly of the present invention has a significant advantage over the more traditional sacrificial anodes currently available.

The invention claimed is:

1. A sacrificial anode assembly for cathodically protecting and/or passivating a metal section, comprising:

a cell, which has an anode and a cathode arranged so as to not be in electronic contact with each other but so as to be in ionic contact with each other such that current can flow between the anode and the cathode;

a connector attached to the anode of the cell for electrically connecting the anode to the metal section to be cathodically protected;

and a sacrificial anode electrically connected in series with the cathode of the cell;

wherein there are provided one or more isolating elements which prevent communication of ionic current from the cell to the environment such that current can only flow between the cathode of the cell and the sacrificial anode and between the anode of the cell and the connector;

and wherein the sacrificial anode and the cell are connected together so as to form a single unit such that the sacrificial anode is electrically connected in series with the cathode of the cell.

2. An assembly according to claim 1, wherein the sacrificial anode is of a shape and size corresponding with the shape of at least part of the cell, such that it fits alongside at least part of the cell.

3. An assembly according to claim 1, wherein the sacrificial anode forms a container within which the cell is at least partly located.

4. An assembly according to claim 1, wherein the sacrificial anode is indirectly connected to the cathode of the cell through an electronically conductive separator.

5. An assembly according to claim 4, wherein a layer of a metal is located between the sacrificial anode and the cathode of the cell so as to allow electronic conduction between these components but to prevent direct contact between these components.

6. An assembly according to claim 1, wherein the sacrificial anode is zinc, aluminum, cadmium or magnesium, or an alloy of one or more of these metals.

7. An assembly according to claim 1, wherein the cell is provided with a porous separator located between the cathode and the anode, which prevents direct contact between the anode and the cathode.

8. An assembly according to claim 1, wherein the sacrificial anode forms a container and the cell is located at least partly in the container.

9. An assembly according to claim 8 wherein the sacrificial anode is in the shape of a generally cylindrical can and the cell is at least partly located in this can.

10. An assembly according to claim 1 which is at least partly surrounded by an encapsulating material.

11. An assembly according to claim 10 wherein the encapsulating material is a porous matrix.

12. An assembly according to claim 11 wherein the porous matrix comprises a cementitious mortar.

13. An assembly according to claim 12 wherein the porous matrix comprises a mortar having a pH greater than 12.

14. An assembly according to claim 10 wherein the encapsulating material contains at least one activator to ensure continued corrosion of the sacrificial anode.

15. An assembly according to claim 14 wherein the activator comprises a humectant.

16. A method of cathodically protecting [a metal section] *steel* in an ionically conductive *concrete or mortar* covering material comprising:

providing a sacrificial anode;

generating a voltage between two connections of a power supply such that current can flow between the negative connection and the positive connection;

in a first protection step, electrically connecting one of the connections of the power supply to the [metal section] *steel* to be cathodically protected and electrically connecting the sacrificial anode in series with the other connection of the power supply such that the voltage generated by the power supply is added to the voltage generated between the sacrificial anode and the [metal] *steel* to produce a voltage greater than the galvanic voltage generated between the sacrificial anode and the [metal section] *steel* alone;

wherein the power supply is otherwise isolated from the environment such that current can only flow into and out of the power supply via the sacrificial anode and the connector;

and, in a second protection step, the voltage generated by the power supply is no longer present and a current flows between the sacrificial anode and the [metal] *steel* to continue protecting and/or passivating the [metal section] *steel*, where the current is generated solely by the galvanic voltage between the sacrificial anode and the [metal] *steel*.

17. The method according to claim 16 wherein the sacrificial anode and the power supply are connected together so as to form a single unit.

18. The method according to claim 17 wherein the sacrificial anode is of a shape and size corresponding with the shape of at least part of the power supply, such that it fits alongside at least part of the anode and cathode.

19. The method according to claim 16 wherein the sacrificial anode forms a container within which the power supply is at least partly located.

20. The method according to claim 16 including surrounding the sacrificial anode by an encapsulating material of a porous matrix.

21. The method according to claim 20 wherein the porous matrix comprises a cementitious mortar.

22. The method according to claim 20 *including surrounding the sacrificial anode by an encapsulating material* wherein the [porous matrix comprises a mortar having] *encapsulating material has* a pH greater than 12.

23. The method according to claim 20 wherein the encapsulating material is pre-cast around the anode.

24. The method according to claim 20 wherein the encapsulating material is provided [after] *as* the sacrificial anode is located at its intended position in the concrete or mortar material.

25. The method according to claim 16 wherein the sacrificial anode is activated to ensure continued corrosion of the sacrificial anode.

26. The method according to claim 16 wherein the power supply comprises an electrolytic cell.

27. The method according to claim 16 wherein the [ionically conductive material is a concrete or mortar material in contact with which the metal] *steel* is a steel reinforcing member.

*28. A sacrificial anode assembly for cathodically protecting and/or passivating a metal section within an ionically conductive concrete or mortar covering material, comprising:*

*a cell, which has an anode and a cathode with an electrolyte therebetween such that current can flow between the anode and the cathode;*

*a connector attached to the anode of the cell for electrically connecting the anode to the metal section to be cathodically protected;*

*and sacrificial anode material electrically connected with the cathode of the cell;*

*wherein there are provided one or more isolating elements which prevent communication of ionic current from the cell to the environment such that current can only flow between the cathode of the cell and the sacrificial anode and between the anode of the cell and the connector;*

*wherein the sacrificial anode and the cell are connected together so as to form a single unit such that the sacrificial anode is electrically connected in series with the cathode of the cell;*

*wherein the assembly comprises a container containing at least part of the anode, the electrolyte and the cathode of the cell;*

*and wherein the sacrificial anode material forms at least part of an outer surface of the container.*

*29. An assembly according to claim 28, wherein the sacrificial anode is zinc, aluminum, cadmium or magnesium, or an alloy of one or more of these metals.*

*30. An assembly according to claim 28 wherein the cell and the container are generally cylindrical.*

*31. An assembly according to claim 28 wherein the container is at least partly surrounded by an encapsulating material.*

*32. An assembly according to claim 31 wherein the encapsulating material is a porous matrix.*

*33. An assembly according to claim 31 wherein the encapsulating material comprises a cementitious mortar.*

*34. An assembly according to claim 33 wherein the encapsulating material has a pH greater than 12.*

*35. An assembly according to claim 31 wherein the encapsulating material contains at least one activator to ensure continued corrosion of the sacrificial anode.*

*36. An assembly according to claim 35 wherein the activator comprises a humectant.*

*37. A method of cathodically protecting steel in an ionically conductive concrete or mortar covering material comprising:*

*providing a sacrificial anode;*

*generating a voltage between two connections of a power supply such that current can flow between the negative connection and the positive connection;*

*in a first protection step, electrically connecting one of the connections of the power supply to the steel to be cathodically protected and electrically connecting the sacrificial anode in series with the other connection of the power supply such that the voltage generated by the power supply is added to the voltage generated between the sacrificial anode and the steel to produce a voltage greater than the galvanic voltage generated between the sacrificial anode and the steel alone which passivates the steel;*

*wherein the power supply is otherwise isolated from the environment such that current can only flow into and out of the power supply via the sacrificial anode and the connector;*

*and, in a second protection step, subsequent to completion of the first step, the voltage generated by the power supply is no longer present and a current flows between the sacrificial anode and the steel to continue protecting and/or passivating the steel, where the current is generated solely by the galvanic voltage between the sacrificial anode and the steel.*

*38. The method according to claim 37 wherein a porous material is provided at the sacrificial anode so as to provide pores that absorb expansive forces generated by expansive corrosion products.*

*39. The method according to claim 37 including providing at least one activator which ensures continued corrosion of the sacrificial anode.*

*40. The method according to claim 39 wherein said at least one activator provides a pH in the encapsulating material sufficiently high for corrosion of the sacrificial anode to occur and for passive film formation on the sacrificial anode to be avoided.*

*41. The method according to claim 39 wherein said at least one activator provides a pH in the encapsulating material greater than 12.*

*42. The method according to claim 39 wherein said at least one activator is provided in a porous material at the sacrificial anode.*

*43. The method according to claim 37 wherein the sacrificial anode is formed of zinc or zinc alloy.*

*44. The method according to claim 37 wherein an encapsulating material is pre-cast around the sacrificial anode.*

*45. The method according to claim 37 wherein an encapsulating material is provided around the sacrificial anode as the sacrificial anode is located at its intended position in the concrete or mortar covering material.*

* * * * *